United States Patent
Poole

(10) Patent No.: US 11,249,293 B2
(45) Date of Patent: Feb. 15, 2022

(54) SYSTEMS, APPARATUS, AND METHODS FOR DYNAMIC FORENSIC ANALYSIS

(71) Applicant: iBallistix, Inc., Palo Alto, CA (US)

(72) Inventor: Robert H. Poole, Annapolis, MD (US)

(73) Assignee: iBallistix, Inc., Palo Alto, CA (US)

( * ) Notice: Subject to any disclaimer, the term of this patent is extended or adjusted under 35 U.S.C. 154(b) by 362 days.

(21) Appl. No.: 16/246,333

(22) Filed: Jan. 11, 2019

(65) Prior Publication Data

US 2019/0219806 A1    Jul. 18, 2019

Related U.S. Application Data

(60) Provisional application No. 62/617,171, filed on Jan. 12, 2018.

(51) Int. Cl.

| | |
|---|---|
| *G02B 21/00* | (2006.01) |
| *F42B 35/00* | (2006.01) |
| *H04W 4/02* | (2018.01) |
| *G02B 21/32* | (2006.01) |
| *G06K 9/00* | (2022.01) |
| *G02B 21/36* | (2006.01) |

(Continued)

(52) U.S. Cl.
CPC .......... *G02B 21/0008* (2013.01); *F42B 35/00* (2013.01); *G02B 21/32* (2013.01); *G02B 21/362* (2013.01); *G06K 9/00201* (2013.01); *H04L 67/2804* (2013.01); *H04W 4/02* (2013.01); *H04W 4/025* (2013.01); *H04W 4/185* (2013.01)

(58) Field of Classification Search
CPC .. G02B 21/0008; G02B 21/32; G02B 21/362; H04L 67/2804; H04W 4/02; H04W 4/025; H04W 4/185; F42B 35/00

USPC ................ 359/368–390, 800–819
See application file for complete search history.

(56) References Cited

U.S. PATENT DOCUMENTS

| | | | |
|---|---|---|---|
| 6,018,394 A * | 1/2000 | Baldur | G01B 11/00 |
| | | | 356/388 |
| D682,903 S | 5/2013 | Bratt | |

(Continued)

FOREIGN PATENT DOCUMENTS

| | | |
|---|---|---|
| EP | 3465344 | 4/2019 |
| WO | WO 2006083081 | 8/2006 |

(Continued)

*Primary Examiner* — Thong Q Nguyen
(74) *Attorney, Agent, or Firm* — Fish & Richardson P.C.

(57) ABSTRACT

A computing system for dynamic forensic data capture and analysis is provided. The computing system may include a processor coupled to a memory to execute forensic analysis detection scheme using a forensic analysis agent of a client node and a forensic analysis module at a networked server node. The processor may be operable to receive a user request for a computer activity and sensed image data associated with the forensic evidence while the client node is coupled within a forensic microscope assembly that optically aligns an image sensor of the client node with the forensic evidence. The processor may also be operable to generate and send ballistic specimen data including images, video, GPS data and the like to the networked server, wherein the processor is operable to generate ballistic imaging metadata. Further, the processor may be operable to detect matching records of spent ballistics and generate a hit report thereby.

22 Claims, 8 Drawing Sheets

(51) Int. Cl.
*H04L 67/561* (2022.01)
*H04W 4/18* (2009.01)

(56) References Cited

U.S. PATENT DOCUMENTS

| | | | | |
|---|---|---|---|---|
| 8,743,194 B2 * | 6/2014 | Fletcher | ............... | G02B 21/02 |
| | | | | 348/79 |
| 9,007,457 B2 | 4/2015 | Levesque | | |
| 9,080,844 B2 | 7/2015 | Beauchamp et al. | | |
| 9,325,884 B2 * | 4/2016 | Fletcher | ............... | A61B 1/227 |
| 9,857,666 B2 | 1/2018 | Coppage et al. | | |
| 10,036,881 B2 | 7/2018 | Schweitzer | | |
| 10,281,708 B2 | 5/2019 | Lin et al. | | |
| 10,288,869 B2 | 5/2019 | Lin et al. | | |
| 10,466,466 B2 | 11/2019 | Cheng | | |
| 10,649,186 B2 | 5/2020 | Lundin et al. | | |
| 2006/0115264 A1 * | 6/2006 | Vezard | ............... | G03B 17/00 |
| | | | | 396/419 |
| 2011/0294543 A1 | 12/2011 | Lapstun et al. | | |
| 2015/0036043 A1 | 2/2015 | Markovic et al. | | |
| 2016/0282593 A1 | 9/2016 | Yan | | |
| 2017/0045724 A1 | 2/2017 | Lin et al. | | |
| 2017/0138840 A1 | 5/2017 | Lin et al. | | |
| 2019/0227289 A1 | 7/2019 | Monk et al. | | |
| 2020/0057288 A1 | 2/2020 | Schulze | | |
| 2020/0183137 A1 | 6/2020 | Hu et al. | | |
| 2020/0252493 A1 | 8/2020 | Meadows et al. | | |

FOREIGN PATENT DOCUMENTS

| | | |
|---|---|---|
| WO | WO 2017195223 | 11/2017 |
| WO | WO 2017209810 | 12/2017 |
| WO | WO 2018087665 | 5/2018 |
| WO | WO 2019103909 | 5/2019 |

* cited by examiner

SYSTEMS, APPARATUS, AND METHODS FOR DYNAMIC FORENSIC ANALYSIS

CROSS REFERENCE TO RELATED APPLICATIONS

This present application relates to commonly-owned U.S. patent application Ser. No. 62/617,171, entitled "Forensic Microscope Assembly," naming Robert H. Poole as the inventor, filed Jan. 12, 2018, which the present application is entitled to the benefit of the filing date; the contents of which are incorporated by herein by reference in its entirety.

BACKGROUND

With the escalation of firearms crime, there is a need for forensic analysis systems that assist in providing resolutions for criminal investigations in a timely manner. Particularly, in the United States, there exists the highest rate of civilian gun ownership per capita with respect to the rest of the world's population. According to the CDC, between 1999 and 2014 there have been 185,718 homicides from use of a firearm and 291,571 suicides using a firearm.

Criminal Investigators need the resources to solve each crime expeditiously. Fortunately, when a gun is made, the manufacturing equipment etches microscopic markings on components of the gun. These markings serve as fingerprints, which can be used to identify each gun. In particular, when the gun is fired, these markings are transferred to the bullet or cartridge case. These markings are also known as tool marks. For the current system of forensic evidence analysis associated with gun-related crimes and injuries, an investigator may need to send the forensic evidence, such as bullets and bullet shell casings to the National Integrated Ballistic Information Network (NIBIN) for processing. More particularly, when law enforcement investigates crimes in which firearms are used, ballistic imaging of such bullets and cartridge cases can be important in solving crime. NIBIN possesses a national database of digital images of spent bullets and cartridge cases that were found at crime scenes or test-fired from confiscated weapons. The Bureau of Alcohol, Tobacco, Firearms, and Explosives (ATF) manages the system and provides the equipment to crime labs around the country. Ballistic imaging is used to convert the spent rounds into two- or three-dimensional digital images that are uploaded into NIBIN. The software on the server searches for possible matches with other rounds that have similar tool marks and thus may have been fired from the same gun. After a possible match, or "hit" is identified, the crime lab secures the actual spent rounds and compares them under a microscope to confirm the hit. Finally, the lab generates a hit report and sends information on the hit to investigators. With the report, law enforcement investigators can link crimes associated with the identified hits, which can help them to identify suspects. Investigators can also use the report to understand patterns of gun crime, such as gun sharing and trafficking.

Unfortunately, criminal investigators often routinely wait a considerable amount of time before they can make this analysis. Although a mobile NIBIN van can be on the location of a shooting or crime, it may be burdensome and costly to maintain the amount of vans necessary to service law enforcement agencies. In many cases, the evidence can be transported to a NIBIN facility by hand carry or other type of conveyance. Currently, the time that it takes for mailing the evidence, ballistic imaging, laboratory analysis, and report generation can be approximately 2-3 months or longer. Long delays mean that once a hit report is sent from the crime lab to law enforcement, it might be too late to aid a particular investigation. Further, the hits often do not contain geographical data, indicating the location where the cartridge was found. This may give the criminal an excessive amount of time to strategize his/her efforts to evade the criminal investigation, deterring a criminal investigation resolution.

It is within this context that the embodiments arise.

SUMMARY

Embodiments of a networked computer system for dynamic forensic data capture and analysis is provided. It should be appreciated that the present embodiment can be implemented in numerous ways, such as a process, an apparatus, a system, a device, or a method. Several inventive embodiments are described below.

In some embodiments, a computing system for dynamic forensic data capture and analysis is provided. The computing system may include a processor coupled to a memory to execute forensic analysis detection scheme using a forensic analysis agent of a client node; wherein, the processor is operable to receive a user request for a computer activity and sense image data associated with the forensic evidence. For example, the processor may capture image and video using a camera utility to capture each surface of a specimen of forensic evidence to detect a variety of striations including breech face marking, firing pin markings, ejection marking and the like. Further, the processor may be operable to capture the Geographical Point System (GPS) coordinates of forensic evidence location. The processor may also be operable to generate and send ballistic specimen data including images, video, GPS data and various other investigative data to a networked server. Further, the processor may be operable to generate ballistic imaging metadata from the ballistic specimen data at the networked server. For example, the processor may generate a three-dimensional mathematical model of the specimen from the captured image data, detecting one or more dimensions of the tool marks to form an associated set of metadata. Moreover, the processor may be operable to generate and send a hit report of the forensic evidence to the client node. In some embodiments, the processor may be operable to perform preliminary analysis on the captured imaging at the client node, wherein striation markings are detected within the captured image data using the past ballistic imaging data downloaded from the networked server and the sample striation image patterns stored within a database. The processor may be operable to mark the detected striations on the captured image data prior to send the marked image data within the ballistic specimen data to the networked server. Further the processor may be able to identify criminal patterns based upon the hit report at the client node and filter suspect data based upon these identified criminal patterns, along with a set of forensic policies. Accordingly, the processor may in response be able to identify potential material suspects based upon the filtered suspect data.

In some embodiments, a tangible, non-transitory, computer-readable media having instructions whereupon which, when executed by a processor, cause the processor to perform the forensic analysis and detection method described herein. The method may include capturing image data of a specimen of forensic evidence at a client node, along with the GPS coordinates of forensic evidence location, where the method controls the lighting and magnification of the specimen. The method may further include generating a ballistic specimen data packet, wherein the ballistic specimen data packet includes the captured images and GPS coordinates. The method may also include sending the ballistic specimen data packet to a networked server. In response, the method may include generating ballistic imaging metadata from the ballistic specimen data at the networked server. Using the ballistic imaging metadata, the method may include generating a hit report of best matching striation markings from a database of past forensic evidence. Next, the method may include sending the hit report having suspect data from the networked server to the client node, wherein the crime lab server verifies the hit report using actual forensic evidence. Further, the method may include identifying criminal patterns based upon the hit report at the client node and filtering suspect data based upon these identified criminal patterns. Using a set of forensic policies, the method may include identifying potential material suspects based upon the filtered suspect data.

In some embodiments, a forensic microscope assembly is provided. The forensic microscope assembly for a client node may include a cradle, wherein the cradle is operable to receive the client node having an image sensor, three-dimensional scanner, and GPS utility. For example, the cradle may include a base portion and a pair of side arms coupled to the base for securely holding the client node. Further, the forensic microscope assembly may include a lens assembly coupled to the cradle such that the lens assembly is positioned to optically align with the image sensor disposed in the client node when the client node is held by the cradle. For example, the lens assembly may include a magnifying lens selectably attached to an assembly housing. A coupling member may be included within the lens assembly for connecting the lens assembly to the cradle. The forensic microscope assembly may include a forensic evidence holding member coupled to the lens assembly, wherein the forensic evidence aligns with the image sensor through the lens assembly. For example, the forensic evidence holding member may include an evidence stabilizer with grasping members for holding the forensic evidence steady while the image is being captured. In some embodiments, the forensic evidence may be a bullet shell casing, wherein the shell casing is held by the grasping members, such that the breech face aligns with the image sensor of the client node. Particularly, the lens assembly having a magnifying lens can magnify the breech face markings, firing pin markings, and ejection markings of the shell casing for imaging, wherein the user can send the images for subsequent identification. Additionally, as detected by the GPS software application utility, the geographical location of the position where the shell casing was found can be sent along with the captured image for mapping the image with other images found within a national database of forensic evidence.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one so skilled in the art without departing from the spirit and scope of the described embodiments.

DETAILED DESCRIPTION

Figure 1A:
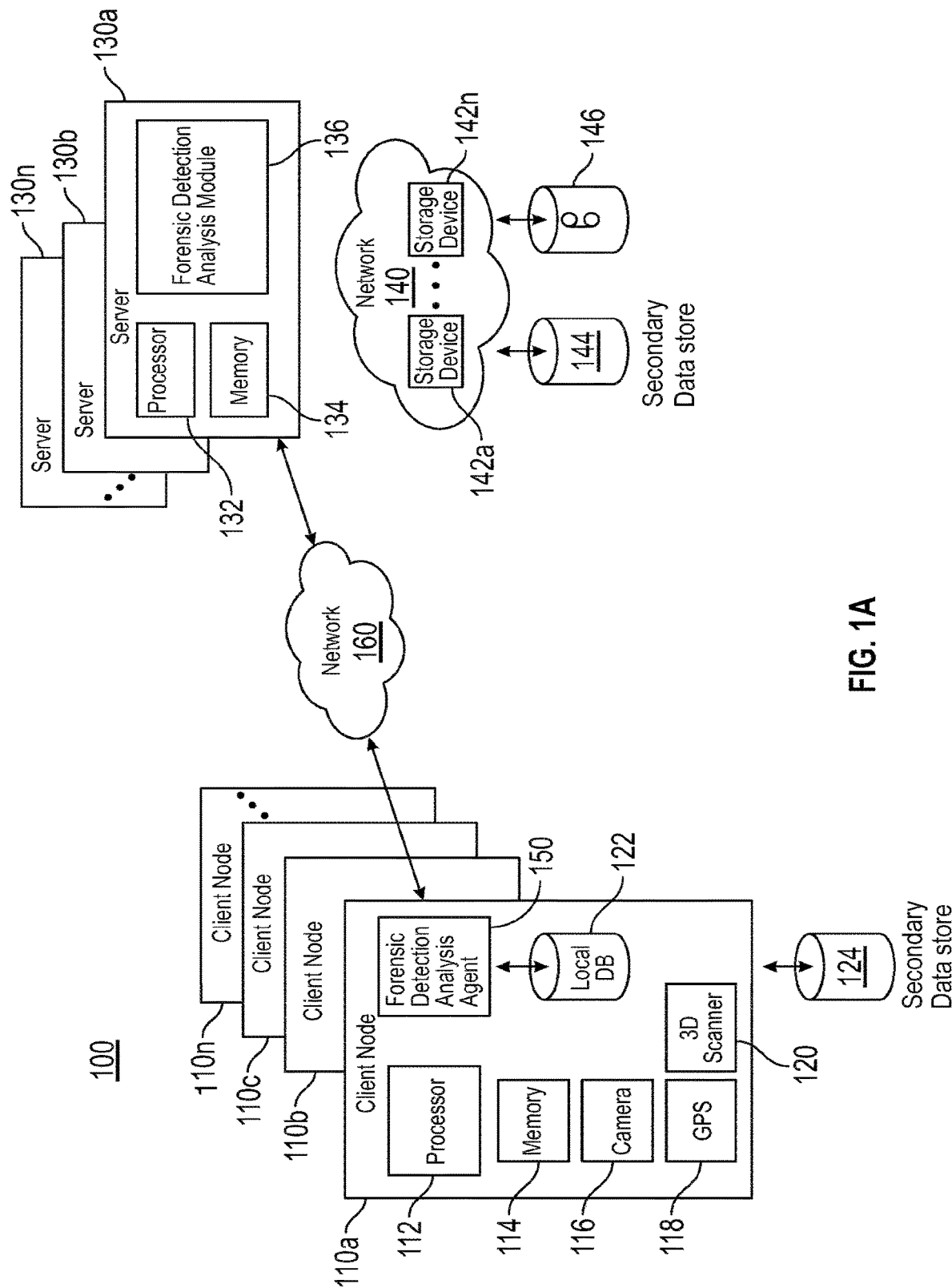
FIG. 1A is a system diagram of networked forensic computing system having multiple client nodes coupled to a server to provide dynamic forensic detection and analysis, in accordance with some embodiments.

The following embodiments describe a system for dynamic forensic data capture and analysis, having a forensic microscope assembly. It can be appreciated by one skilled in the art, that the embodiments may be practiced without some or all of these specific details. In other instances, well known process operations have not been described in detail in order not to unnecessarily obscure the embodiments.

The networked computer system for dynamic forensic data capture and analysis may include a processor coupled to a memory to execute forensic analysis detection scheme using a forensic analysis agent of a client node; wherein, the processor is operable to receive a user request for a computer activity and sense image data associated with the forensic evidence. For example, the processor may capture image and video contents of each surface of a specimen of forensic evidence to detect a variety of striations including breech face marking, firing pin markings, ejection marking and the like using a camera utility; wherein the processor can control the lighting and magnification setting of a forensic microscope assembly that stabilizes the forensic evidence for image capture. Further, the processor may be operable to capture the Geographical Point System (GPS) coordinates of forensic evidence location. The processor may also be operable to generate and send ballistic specimen data including images, video, GPS data and the like to a networked server. Further, the processor may be operable to generate ballistic imaging metadata from the ballistic specimen data at the networked server. For example, the processor may generate a three-dimensional mathematical model of the specimen from the captured image data, detecting one or more dimensions of the tool marks to form an associated set of metadata. Moreover, the processor may be operable to generate and send a hit report of the forensic evidence to the client node. In some embodiments, the processor may be operable to perform preliminary analysis on the captured imaging at the client node, wherein striation markings are detected within the captured image data using the past ballistic imaging data downloaded from the networked server and the sample striation image patterns stored within a database. The processor may be operable to mark the detected striations on the captured image data prior to sending the marked image data within the ballistic specimen data to the networked server. Further the processor may be able to identify criminal patterns based upon the hit report at the client node and filter suspect data based upon these identified criminal patterns, along with a set of forensic policies. Accordingly, the processor may in response be able to identify potential material suspects based upon the filtered suspect data.

The forensic microscope assembly for a client node in some embodiments may include a cradle, wherein the cradle is operable to receive the client node having an image sensor. For example, the cradle may include a base portion and a pair of side arms coupled to the base for securely holding the client node. Further, the forensic microscope assembly may include a lens assembly coupled to the cradle such that the lens assembly is positioned to optically align with the image sensor disposed within the client node when the client node is held by the cradle. For example, the lens assembly may include a magnifying lens selectably attached to an assembly housing. Another coupling member may be included within the lens assembly for connecting the lens assembly to the cradle. The forensic microscope assembly may include a forensic evidence holding member coupled to the lens assembly, wherein the forensic evidence aligns with the image sensor through the lens assembly. For example, the forensic evidence holding member may include an evidence stabilizer with one or more grasping members for holding the forensic evidence steady while the image is being captured. In some embodiments, the forensic evidence may be a bullet shell casing, wherein the shell casing is held by the one or more grasping members, such that the breech face of the shell casing aligns with the image sensor within the client node. Particularly, upon user request, the forensic detection analysis agent may control a range of magnification settings of the magnifying lens within the lens assembly in an effort to make breech face markings, firing pin markings, and ejection markings of the shell casing visible for imaging. The forensic detection analysis agent can also adjust the lighting upon user request; and thereby, send the captured images for subsequent analysis. Additionally, as detected by a GPS software application utility of the client node, the forensic detection analysis agent can retrieve the geographical location of the position where the shell casing was found can be sent along with the image for mapping the image with other images found within a forensic detection server having a database of forensic evidence.

Advantageously, criminal investigators may no longer have to wait weeks for delivery of the actual evidence to a forensic laboratory for analysis. The mobile forensic microscope assembly having a magnifier lens assembly, which couples to the client node, can capture striations and microscopic images on the breech face of a firearms cartridge. The images can be sent to a server having a forensic detection analysis module that uses particular algorithms to make comparisons of these images with other stored markings associated with other firearms. Using a database of striations associated with various crime gun, a search report can be generated that identifies criminal leads that criminal investigators can use in shooting investigations. Once the investigators know that a particular firearm fired bullets at certain locations, they can start tying multiple crimes to specific people.

In the following description, numerous details are set forth. It will be apparent, to one skilled in the art, that the present invention may be practiced without these specific details. In some instances, well-known structures and devices are shown in block diagram form.

Some portions of the detailed descriptions, which follow, are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "capturing," "generating," "detecting," "comparing," "downloading," "compiling," "retrieving," "identifying", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), erasable programmable read-only memories (EPROMs), electrically erasable read-only memories (EEPROMs), magnetic or optical cards, or any type of media suitable for storing electronic instructions, each coupled to a computer system bus.

Reference in the description to "one embodiment" or "an embodiment" means that a particular feature, structure, or characteristic described in connection with the embodiment is included in at least one embodiment of the invention. The phrase "in one embodiment" located in various places in this description does not necessarily refer to the same embodiment. Like reference numbers signify like elements throughout the description of the figures.

Referring to FIG. 1A, a system diagram of networked forensic computing system having multiple client nodes coupled to a server to provide dynamic forensic detection and analysis, in accordance with some embodiments is shown. The system includes at least one client node 110a-n, a network 160, at least one forensic detection server 130a-n, and a plurality of secondary storage devices 142a-n, 144, and 146. Computing devices nodes 110a-n, with local data store 122 and secondary data store 124, are coupled by a network 160 to the forensic detection server 130a-n having its own forensic detection analysis module 136 and remote storage device 142a-n. Each client node 110a-n may include a forensic detection analysis agent 150, memory 114, a processor 112, camera 116, and local data store 122. In some embodiments, the client node may also include a GPS utility 118, and three-dimensional (3D) scanner 120, and a secondary data store 124. Examples of the client nodes 110a-n may include, but are not limited to, personal computers, laptops, PDAs, mobile phones, network appliances, and the like. In some embodiments, the forensic detection analysis agent 150 may serve as a device that communicates with the forensic detection server 130a-n to perform the method of dynamic forensic detection and analysis described more in detail below. In other embodiments, the forensic detection analysis module 136 within the forensic detection server 130a may communicate with each client node 110a-n and serve as the sole agent that performs the method of forensic detection and analysis described herein. The client nodes 110a-n, forensic detection server 130a, and the storage devices 142a-n may reside on the same local area network (LAN), or on different LANs that may be coupled together through the Internet, and may be separated by firewalls, routers, and/or other network devices. In one embodiment, client nodes 110a-n may couple to network 160 through a mobile communication network. In another embodiment, the client nodes 110a-n, forensic detection server 130a-n, and the storage devices 142a-n may reside on different networks. In some embodiments, the forensic detection server 130a-n may reside in a cloud network. Although not shown, in various embodiments, the client node 110a-n may be notebook computers, desktop computers, microprocessor-based or programmable consumer electronics, network appliances, mobile telephones, smart telephones, pagers, radio frequency (RF) devices, infrared (IR) devices, Personal Digital Assistants (PDAs), set-top boxes, cameras, integrated devices combining at least two of the preceding devices, and the like.

The forensic detection server 130a may comprise a processor 132, memory 134, and forensic detection analysis module 136. The forensic detection server 130a may be a NIBIN server or a crime lab server. In particular, the forensic detection analysis module 136 may comprise processing software instructions and/or hardware logic required for forensic detection and analysis according to the embodiments described herein. The forensic detection server 130a-n may provide remote cloud storage capabilities for detected patterns associated with forensic detection, digital images of spent bullets and cartridge cases that were found at crime scenes or test-fired from confiscated weapons, detected striation tool marks, and various types of criminal behaviors or policies associated with forensic detection, through the storage devices 142a-n coupled by network 140. Further, these may couple to one or more tape-out devices 146 or any other secondary data store 144. The forensic detection server 130a may also comprise a local data storage unit (not shown), which can be one or more centralized data repositories having mappings of respective associations between each ballistic imaging and metadata and its location within a remote storage devices 142a-n. The local data store may represent one or multiple data structures (databases, repositories, files, etc.) residing on one or more mass storage devices, such as magnetic or optical storage based disks, tapes or hard drives. This local data store may be an internal component of the forensic detection server 130a-n. The local data store also may couple externally to forensic detection server 130a-n, or remotely through a network. The forensic detection server 130a-n can communicate with the remote storage devices 142a-n over a public or private network. Although not shown, in various embodiments, the forensic detection server 130a-n may be a notebook computer, desktop computer, microprocessor-based or programmable consumer electronics, network appliance, mobile telephone, smart telephone, radio frequency (RF) device, infrared (IR) device, Personal Digital Assistant (PDA), set-top box, an integrated device combining at least two of the preceding devices, and the like.

The system may include remote data storage units and tape-out devices coupled by a network to client nodes 110a-n. As such, a database of criminal/forensic behavior and/or policies may be stored within the local data store (122), remote disks 142a-n, secondary data store (124, 144), or tape-outs devices 146. The database may include detected patterns, previously stored striation markings, digital images of spent bullets and cartridge cases that were found at crime scenes or test-fired from confiscated weapons, and various types of behaviors or policies associated with forensic detection. In some embodiments, the client node 110a may retrieve previous results relating to a specimen initially from a remote data store to a local data store 122. In other embodiments, the database of criminal behavioral characteristics may be stored locally on the client node 110a-n or the forensic detection server 130a-n.

In operation, the forensic detection analysis agent 150 may couple to the memory 114 and processor 112 to execute a forensic analysis detection scheme; wherein, the forensic detection analysis agent 150 is responsive to a user request for a computer activity and sense image data associated with the forensic evidence. For example, when requested by the user, the forensic detection analysis agent 150 will instruct the processor 112 to actuate the image sensor of the capture image and video contents using camera 116, wherein a two-dimensional image of each surface of a specimen of forensic evidence is captured to detect a variety of striations including breech face marking, firing pin markings, ejection marking and the like. Also upon user request, the forensic detection analysis agent 150 may control a range of magnification settings of a magnifying lens (not shown) within a forensic microscope assembly (described more in detail with reference to FIGS. 2-7) in an effort to make breech face markings, firing pin markings, and ejection markings of the shell casing visible for imaging. The forensic detection analysis agent 150 can also adjust the lighting upon user request. In the alternative, the processor 112 may capture three-dimensional image data of the specimen of forensic evidence using the three-dimensional scanner 120. Additionally, the processor 112 may be operable to capture the geographical point system (GPS) coordinates of forensic evidence location. The forensic detection analysis agent 150 may generate and send ballistic specimen data packet including images, video, GPS data, scanning data, and the like to one or more of the networked servers 130*a-n*. Other data associated with the forensic specimen may be captured and sent, such as an individual evidence number, officer address, caliber, type of crime, department, and the like. In response, the forensic detection analysis module 136 may generate ballistic imaging metadata from the ballistic specimen data at the networked server. For example, the forensic detection analysis module 136 in cooperation with processor 132 and memory 134 may generate a three-dimensional mathematical model of the specimen from the captured image data, detecting one or more dimensions of the tool marks to form an associated set of metadata. Moreover, the forensic detection analysis module 136 may generate and send a hit report of the forensic evidence to the client node. For example, the forensic detection analysis module 136 may detect one or more dimension measurements of one or more tool marks and identify an associated position of each tool mark on the specimen. The dimension measurements may include the number of tool marks; the width and depth of each tool mark; the angle and direction of each spiral impression within the specimen; and the like. The forensic detection analysis module 136 may compare the dimension measurement and the position to a second set of stored forensic evidence measurements. Further, forensic detection analysis module 136 may detect a best match within a predetermine range of the dimension measurement and position. As a result, the forensic detection analysis module 136 identify a forensic evidence specimen and a suspect associated with the detected best match and generate a list of each identified forensic evidence specimen and an associated suspect to form the hit report having suspect data. The hit report can be used to further an investigation. It may not be conclusive evidence for the indictment of a suspect.

In some embodiments, the forensic detection analysis agent 150 may perform a preliminary analysis on the captured imaging data at the client node 110*a-n*, wherein striation markings are detected within the captured image data using the past ballistic imaging data downloaded from the networked server 130*a-n* and sample striation image patterns stored within a local data store 122 (to be explained in further detail with reference to FIG. 1B). For example, the processor 112 as instructed by the forensic detection analysis agent 150 may convert the two dimensional images captured by camera 116 into a three-dimensional model of the forensic evidence to be stored in local data store 122 and/or 124, in some embodiments. In the alternative, the processor 112 may capture three-dimensional image data of the specimen of forensic evidence using the three-dimensional scanner 120, using the three-dimensional image data to generate a three-dimensional model. The forensic detection analysis agent 150 can mark the detected striations on the captured image data or three-dimensional model prior to sending the marked image data within the ballistic specimen data to the networked server. Further, the forensic detection analysis agent 150 may be able to identify criminal patterns based upon the hit report at the client node 110*a-n* and filter suspect data based upon these identified criminal patterns, along with a set of forensic policies stored within local data store 122 and/or 124. Accordingly, the forensic detection analysis agent 150 may in response be able to identify potential material suspects based upon the filtered suspect data.

Advantageously, the client node 110*a-n* can be a portable handheld device that can be utilized in remote locations, where ballistics matches can be generated in the field by investigators. Local databases associated with each networked server 130*a-n* can store data pertaining to the region of service. Furthermore, the system for dynamic forensic data capture and analysis described herein can drastically decrease the time it takes for evidence recovered at the crime scene to be evaluated by a NIBIN specialist. That is, evidence evaluation can occur in real-time, while the investigating agent is still on location. In addition, this forensic system can drastically limit chain of custody issues associated with transporting evidence. As such, the forensic evidence can be maintained by the investigating agent and placed directly in the evidence vault. Further, leads can be generated in real time, where the agent can use the hit report having suspect data during an interview of witnesses and/or suspects while he is still on location.

It is appreciated that the components of exemplary operating environment 100 are exemplary and more or fewer components may be present in various configurations. It is appreciated that operating environment may be part of a distributed computing environment, a cloud computing environment, a client server environment, and the like.

In other words, as would be apparent to one of ordinary skill in the art after reading this description, the various features and functionality described herein may be implemented in the forensic detection system using any arrangement components necessary to perform the dynamic forensic detection and analysis; and can be implemented in one or more separate or shared modules in various combinations and permutations.

Figure 1B:
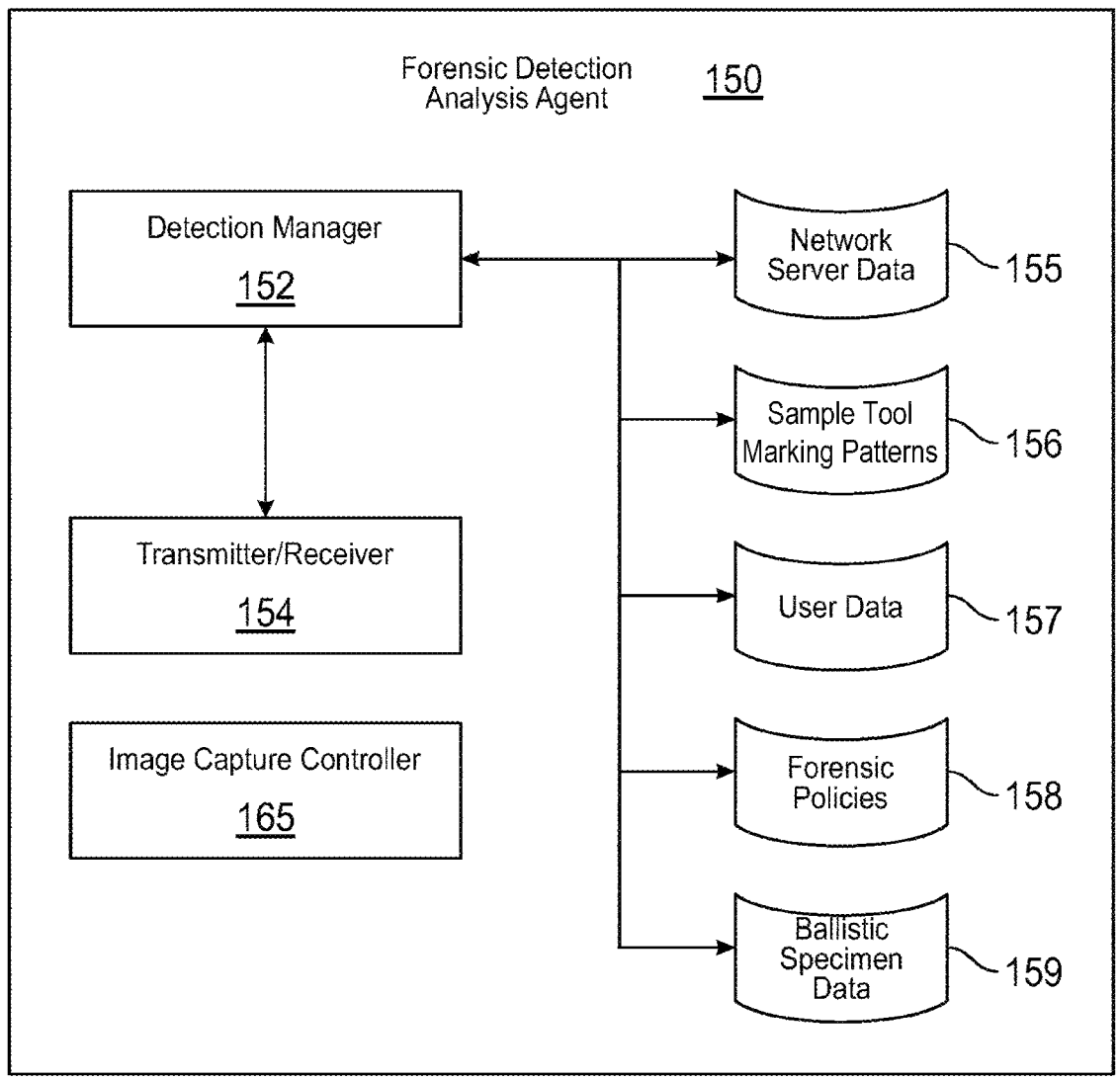
FIG. 1B is a block diagram showing the contents of a forensic detection analysis agent of FIG. 1A as a striation detection utility in some embodiments.

Referring the FIG. 1B, block diagram showing the contents of a forensic detection analysis agent of FIG. 1A as a striation detection utility in some embodiments is shown. An exemplary embodiment of the forensic detection analysis agent 150 is shown. Forensic detection analysis agent 150 may include a detection manager 152 in cooperation with five differing databases, including one for network server data store 155, sample tool marking patterns data store 156, user data store 157, forensic policies data store 158, and ballistic specimen data store 159. The forensic detection analysis agent 150 may also include a transmitter/receiver 154 that couples to receive and transmit data from the camera utility 116, GPS utility 118, 3D scanner utility 120, and one or more of the network detection servers 130*a-n*. The forensic detection analysis agent 150 may also include an image capture controller 165 for controlling the light setting and magnification of the forensic microscope assembly (discussed in further detail with reference to FIG. 7).

In operation, the detection manager 152 may perform the functions of forensic detection and analysis. For example, the detection manager 152 may identify striation markings using previous forensic history data by accessing a database containing previously stored digital images of spent bullets and cartridge cases that were found at crime scenes or test-fired from confiscated weapons, wherein the data is downloaded from the forensic detection server 130*a-n* and stored in network server data store 155. The detection manager 152 may collect sample patterns of striation tool marks, including breech face marking, firing pin markings, ejection marking and the like. The collected sample patterns may be stored in the sample tool marking patterns data store 156. Additionally, the detection manager 152 may analyze the forensic specimen based upon user data of data store 157, wherein the location of the investigator, the type of department, specialty and skills are used to select a best match for identifying suspect data. Further, the detection manager 152 may identify suspect data based upon forensic policies stored in data store 158, wherein particular aspects of the type of crime are used to define the analysis performed. For example, forensic policies relating to homicide, suicide, terrorism, and the like may be stored in forensic policies data store 158. In particular, a terrorist attack or a homicide may have a higher priority ranking associated with it than a less lethal criminal activity, such as suicide, robbery, car-jacking, random shootings and the like. Forensic policies data store 158 may also store datasets as to a plurality of make and model information corresponding to various types of firearms and their associated ammunition. Forensic policies data store 158 may store other criminal investigative data, such as name of criminal investigator, street address of crime, the crime type, caliber of firearm used, number of shell casings available, and the like. Witness statements can be preserved in a case management system database (not shown). Additionally, the detection manager 152 may identify criminal patterns based upon hit reports downloaded from one or more of the forensic detection server 130*a-n* to network server data store 155. Ultimately, the detection manager 152 may store ballistic specimen data in ballistic specimen data store 159, which can also be used for preliminary analysis on the client node 110*a-n* prior to transmitting the same to a forensic detection server 130*a-n*.

As used herein, the term agent and module might describe a given unit of functionality that can be performed in accordance with one or more embodiments of the present invention. As used herein, an agent and/or a module might be implemented utilizing any form of hardware, software, or a combination thereof. For example, one or more processors, controllers, application specific integrated circuits (ASICs), programmable logic arrays (PLAs), programmable array logic (PALs) devices, complex programmable logic devices (CPLDs), field programmable gate arrays (FPGAs), logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Figure 2:
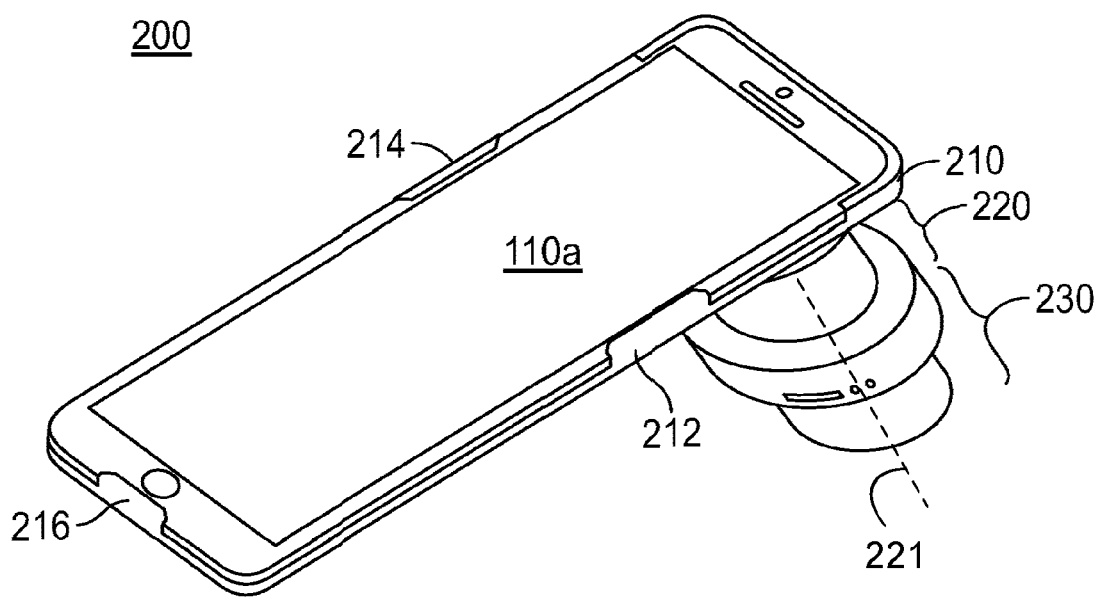
FIG. 2 is a perspective view of a forensic microscope assembly coupled to a client node, in accordance with some embodiments.
Figure 3:
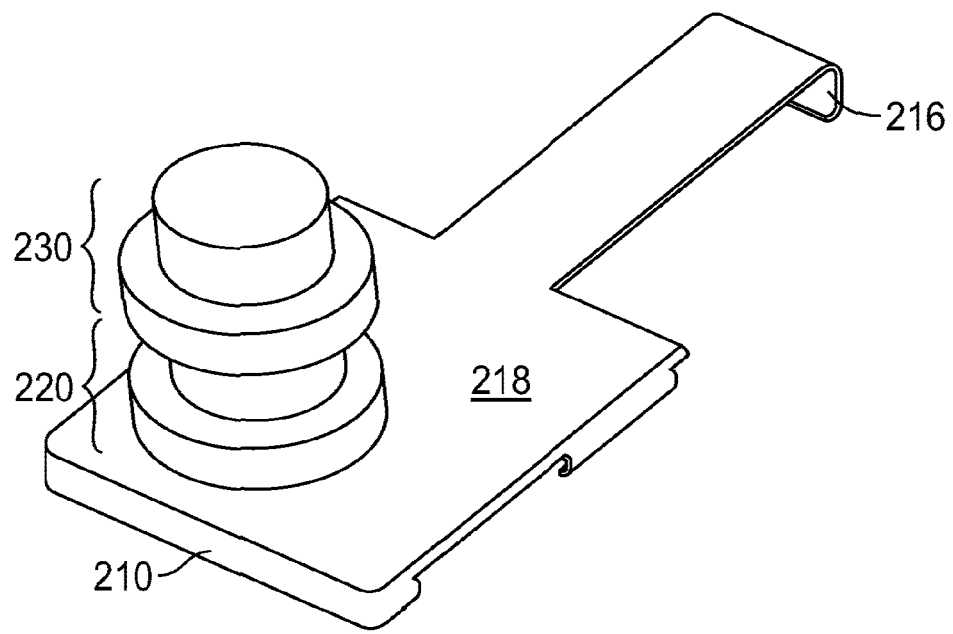
FIG. 3 is a bottom view of the forensic microscope assembly of FIG. 2 in some embodiments.

Referring to FIG. 2, a perspective view of a forensic microscope assembly coupled to a client node 110*a*, in accordance with some embodiments is shown. In some embodiments, the forensic microscope assembly 200 may include a cradle 210, a lens assembly 220 and a forensic evidence holding member 30. As shown in figures, FIGS. 1-3, the cradle 210 is designed to be operable to receive the client node 110*a*, wherein the client node 110*a* includes a camera 116, e.g., an image sensor device, having a camera software application that enables the user to take photographed images of the forensic evidence (shown in detail with respect to FIG. 7). More particularly, referring to FIG. 3, a bottom view of the forensic microscope assembly 200 of FIG. 2 in some embodiments is shown. In some embodiments, the cradle 210 may include a base portion 218 and a pair of side arms (212, 214) coupled to the base for securely holding the client node 110*a*. Optionally, the cradle 210 may include a third arm 216 for further securing of the client node 110*a*. The base portion 218 may also include a coupling member (described in detailed with reference to FIG. 7) for attaching the cradle 210 to the lens assembly 220. Further, the forensic microscope assembly 200 may include a lens assembly 220 coupled to the cradle 210, such that the lens assembly 220 is positioned to optically align, along an axis 221, with the camera lens associated with image sensor (not shown) disposed within the client node 110*a*, when the client node 110*a* is held by the cradle 210. In some embodiments, the lens assembly 220 may include a magnifying lens (described in detail with reference to FIG. 7) that may be selectably attached to the lens assembly housing. In some embodiments, a coupling member may be included within the lens assembly 220 for connecting the lens assembly 220 to the cradle 210. Further, the forensic microscope assembly 200 may include a forensic evidence holding member 230 coupled to the lens assembly 220, wherein the forensic evidence aligns with the image sensor through the lens assembly 220. In some embodiments, the forensic evidence holding member 230 may include an evidence stabilizing unit with grasping members for holding the forensic evidence steady while the image is being captured (more detail is given with reference to FIGS. 4-6B).

In some embodiments, the forensic microscope assembly 200 may solely comprise the forensic evidence holding member 230 and a coupling member (not shown) to be coupled to a pre-existing magnifying lens assembly for client nodes. The housing for the forensic microscope assembly 200 can be formed from a great variety of materials including plastic, glass, metal, wood, and the like. Although not shown, in various embodiments, the client node 110*a* may comprise a mobile device, a notebook computer, desktop computer, microprocessor-based or programmable consumer electronic, network appliance, mobile telephone, smart telephone, pager, radio frequency (RF) device, infrared (IR) device, Personal Digital Assistant (PDA), set-top box, camera, integrated device combining at least two of the preceding devices, and the like.

Figure 4:
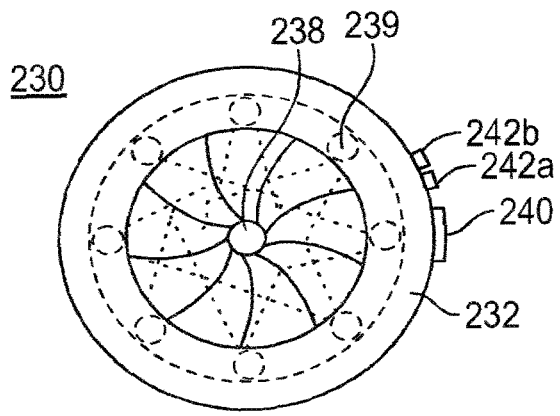
FIG. 4 is a top view of a forensic evidence holding member of the forensic microscope assembly of FIG. 2 in accordance with some embodiments.
Figure 5A:
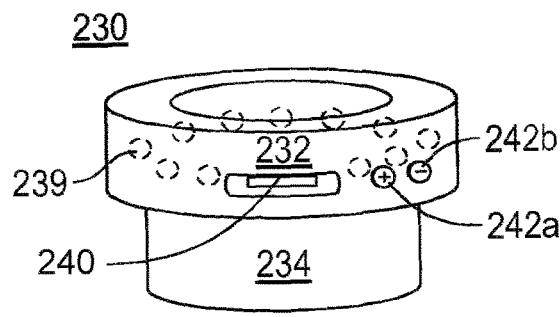
FIG. 5A is a side view of the forensic evidence holding member of the forensic microscope assembly of FIG. 2 in accordance with some embodiments.

Referring to FIG. 4, a top view of a forensic evidence holding member 230 of the forensic microscope assembly 200 of FIG. 2 in accordance with some embodiments is shown. In some embodiments, the forensic evidence holding member 230 may include a housing 232, an evidence stabilizing unit 234, and a plurality of light sources 239. The evidence stabilizing unit 234 may be formed by a plurality of grasping members 236 that hold the forensic evidence 238, e.g., a bullet shell casing, in place. During operation, the user may enable the plurality of light sources 239 to be powered on by switching the switch 240. In some embodiments, the user may adjust the setting of the one or more of the plurality of light sources 239 through the forensic detection analysis agent 150. As represented by the dotted lines, the illumination of the field of light can properly provide enough lighting for capturing marking on the forensic evidence 238 held by the grasping members 236. In some embodiments, the forensic evidence holding member 230 may include switches (242*a*, 242*b*) for increasing and decreasing the intensity of the light. Thereby, during operation, the user can adjust the lighting to the appropriate setting for capturing the striations using these increase and decrease intensity switches (242*a*, 242*b*). Further, in some embodiments, the light source may be designed to house lights at differing angles, such that the user can adjust the light at the 90°, 180°, 270°, and 360° view points. As shown in FIG. 5A, a side view of the forensic evidence holding member 230 of the forensic microscope assembly 200 of FIG. 4 in accordance with some embodiments is provided.

Figure 5B:
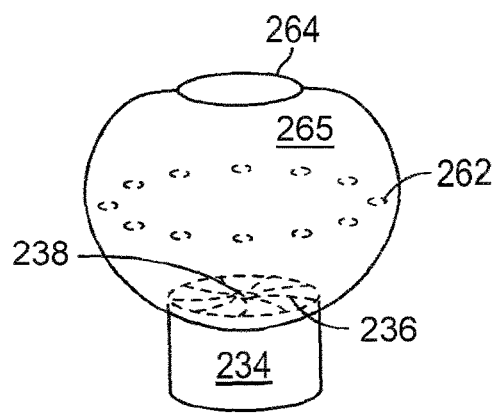
FIG. 5B is a side view of a second embodiment of a forensic evidence holding member within a forensic microscope assembly in accordance with some embodiments.

The housing 232 of the forensic evidence holding member 230 may be cylindrical as shown. In the alternative, as shown in FIG. 5B, the housing 232 of the forensic evidence holding member 230 may be other of another shape or in a cylindrical shape, e.g., as show in FIG. 5A. The housing 232 can take on a variety of shapes including but not limited to, for example, cylindrical, spherical, planar, triangular, octagonal, and the like. In particular with reference to FIG. SB, a side view of a second embodiment of a forensic evidence holding member 265 within a forensic microscope assembly in accordance with some embodiments is shown. As shown, the housing of forensic evidence holding member 265 may be spherical, wherein the light source 262 may comprise a plurality of lights coupled to the center portion of a spherical housing 264. The forensic evidence 238 may be held by any type of grasping member for stabilization within the evidence stabilizer similar to the one shown in FIG. 5A.

Figure 6A:
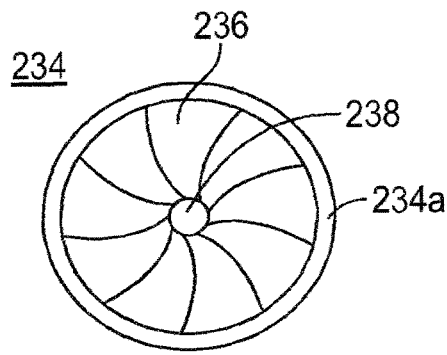
FIG. 6A is a top view of the evidence-stabilizing unit of the forensic evidence holding member of FIG. 5A in some embodiments.
Figure 6B:
FIG. 6B is a side view of the evidence stabilizer of FIG. 5A in some embodiments.

Referring to FIG. 6A, a top view of the evidence stabilizing unit 234 of the forensic evidence holding member 230 and 265 of FIGS. 5A and 5B in some embodiments is shown; while FIG. 6B displays a side view of the evidence stabilizing unit 234 of FIG. 6A. The housing 234a can include a grip portion 243 that allows a user to rotate a portion of the housing 234a to engage the grasping member 236 to secure the forensic evidence 238. The evidence stabilizing unit 234 may include housing 234a that contains a grasping member 236 for securing the forensic evidence 238 in place for image capture. In some embodiments, the grasping member 236 may include one or more grasping arms 237. The housing 234a can be formed of a great variety of materials including plastic, glass, metal, wood and the like. The housing 234a can take on a variety of shapes including but not limited to cylindrical, spherical, planar, triangular, octagonal, and the like.

Figure 7:
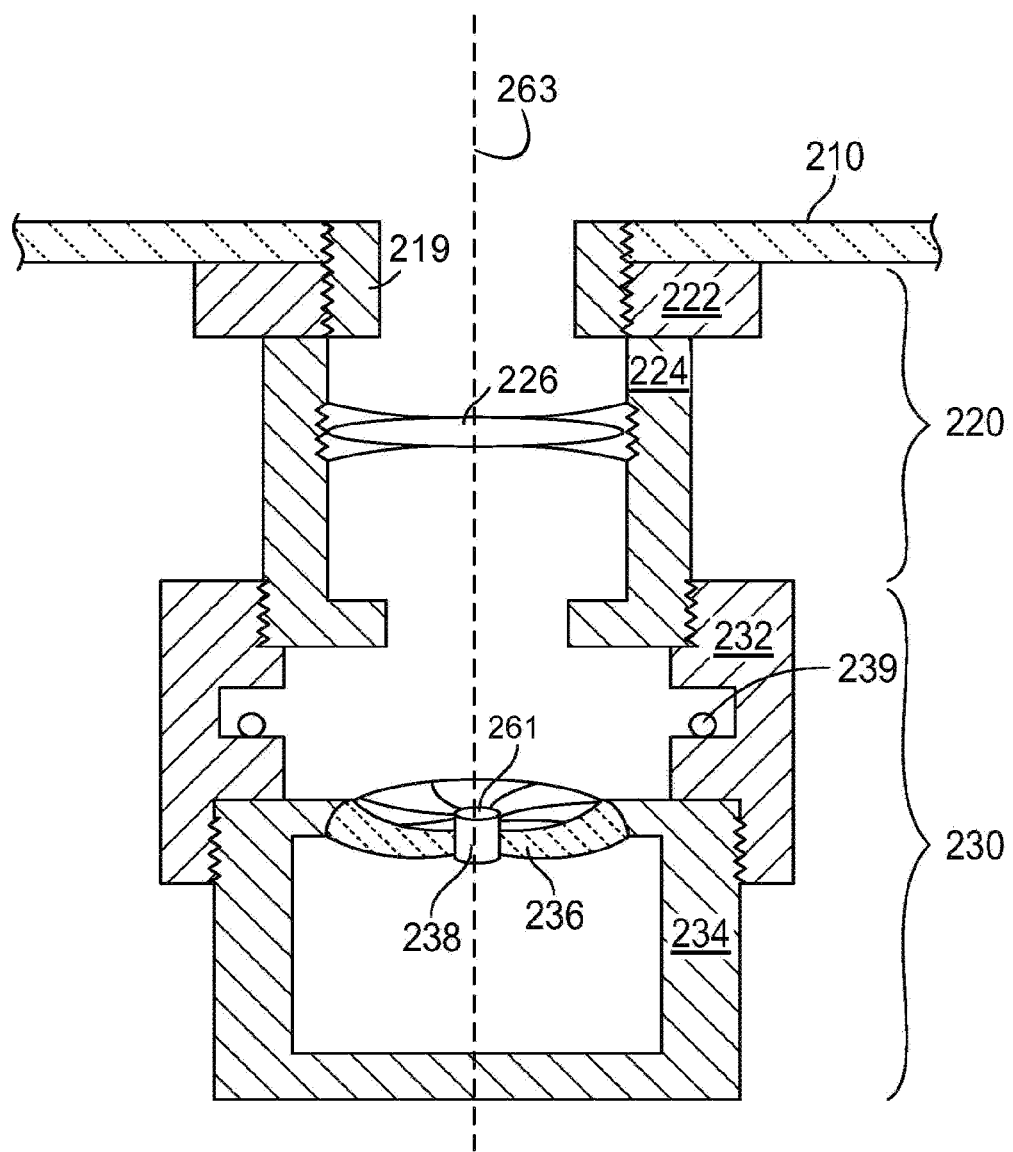
FIG. 7 is a cross-sectional view of the forensic microscope assembly for the client node of FIG. 2 in accordance with some embodiments.

Referring to FIG. 7, a cross-sectional view of the forensic microscope assembly of FIG. 2 in accordance with some embodiments is shown. As shown, the lens assembly 220 couples between the forensic holding member 230 and the cradle 210. The lens assembly 220 may include at least one lens 226 coupled within housing 224. The lens 226 may include an adjustable magnification. The housing portion 222 of the lens assembly may include a coupling member 219 for coupling base of the cradle 210 to the lens assembly 220. The forensic holding member 230 may include the housing 232 (having the plurality of light sources 239) coupled to the evidence stabilizing unit 234. In some embodiments, the forensic evidence 238 may be a bullet shell casing, wherein the forensic evidence 238 can be held by the grasping members 236, such that the breech face 261 of the forensic evidence 238 aligns with the image sensor within the client node 110a along an axis 263. In some embodiments, the forensic detection analysis agent 150 can adjust the magnification of a magnifying lens 226 can magnify the breech face markings, firing pin markings, and ejection markings of the shell casing for imaging, wherein the forensic detection analysis agent 150 can send the images for subsequent identification. As shown, the lens assembly 220 may include at least one magnifying lens 226 coupled within house 224. Further, the forensic detection analysis agent 150 can actuate and adjust the light source 239 of the forensic holding member 230 to light the forensic evidence 238 in preparation for imaging. Although the wiring of the circuit to control the magnification and light setting is not shown, as can be appreciated by those skilled in the art these features can be implemented readily. In operation as noted above, once the images are captured, the forensic detection analysis agent 150 can send these images directly or indirectly to a networked server 130a-n, such as a NIBIN or Crime lab server for further forensic analysis. In some embodiments, the metadata associated with the client node 110a-n may be sent with these images. Additionally, as detected by the GPS software application utility 118 of the client node 110a, the forensic detection analysis agent 150 can detect the geographical location of the position where the forensic evidence 238 was found and send this data within the ballistic specimen data packet along with the captured images for mapping the image with other images found within any of the networked storage devices, such as the NIBIN national database of forensic evidence.

Figure 8:
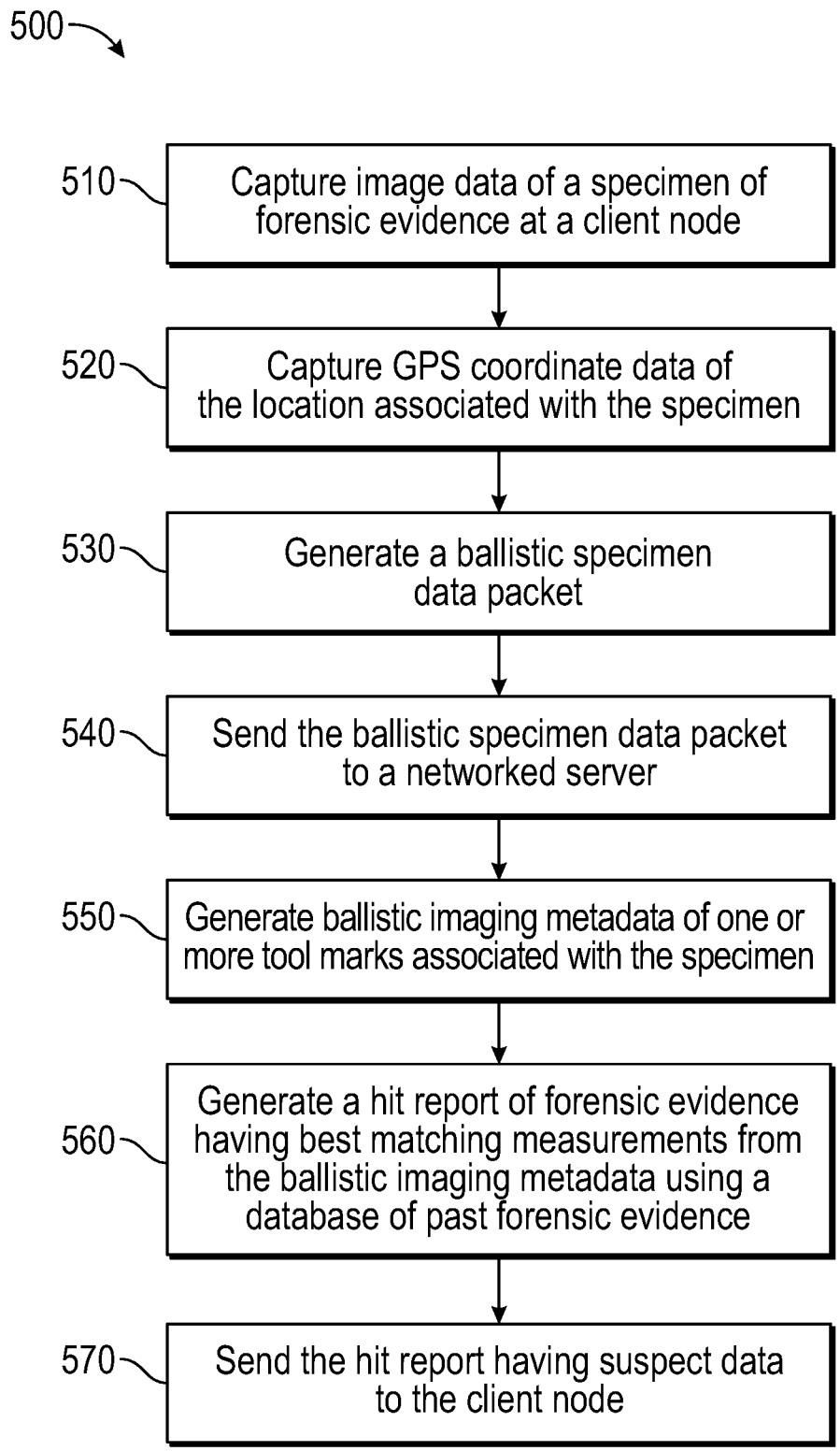
FIG. 8 is a flow diagram of a method of forensic evidence analysis in accordance with some embodiments.

Referring to FIG. 8, a flow diagram of a method 500 of forensic evidence analysis in accordance with some embodiments is shown. The method may include capturing image data of a specimen of forensic evidence at a client node in an action 510. For example, the user can request the forensic detection analysis agent 150 to instruct the processor 112 to capture image and video contents using camera 116, wherein each surface of a specimen of forensic evidence is captured to detect a variety of striations including breech face marking, firing pin markings, ejection marking and the like. The method may also include capturing GPS coordinate data of the location associated with the specimen in an action 520. Further in an action 530, the method may include generating a ballistic specimen data packet, wherein the ballistic specimen data packet includes the captured image data and GPS coordinate data. For example, the forensic detection analysis agent 150 may generate ballistic specimen data including images, video, GPS data, scanning data, and the like. In an action 540, the method may also include sending the ballistic specimen data packet to a networked server, such as networked server 130a-n at NIBIN or a crime lab. Next, the method may include generating ballistic imaging metadata of one or more tool marks associated with the specimen from the ballistic specimen data packet at the networked server in an action 550. For example, the forensic detection analysis module 136 in cooperation with processor 132 and memory 134 may generate a three-dimensional mathematical model of the specimen from the captured image data, detecting one or more dimensions of the tool marks to form an associated set of metadata. The method may also include generating a hit report of forensic evidence having best matching measurements from the ballistic imaging metadata using a database of past forensic evidence in an action 560. For example, the forensic detection analysis module 136 may detect one or more dimension measurements of one or more tool marks and identify an associated position of each tool mark on the specimen. The forensic detection analysis module 136 may compare the dimension measurement and the position to a second set of stored forensic evidence measurements. Further, forensic detection analysis module 136 may detect a best match within a predetermine range of the dimension measurement and position. As a result, the forensic detection analysis module 136 identify a forensic evidence specimen and a suspect associated with the detected best match and generate a list of each identified forensic evidence specimen and an associated suspect to form the hit report having suspect data. In an action 570, the method may include sending the hit report having suspect data to the client node.

Figure 9:
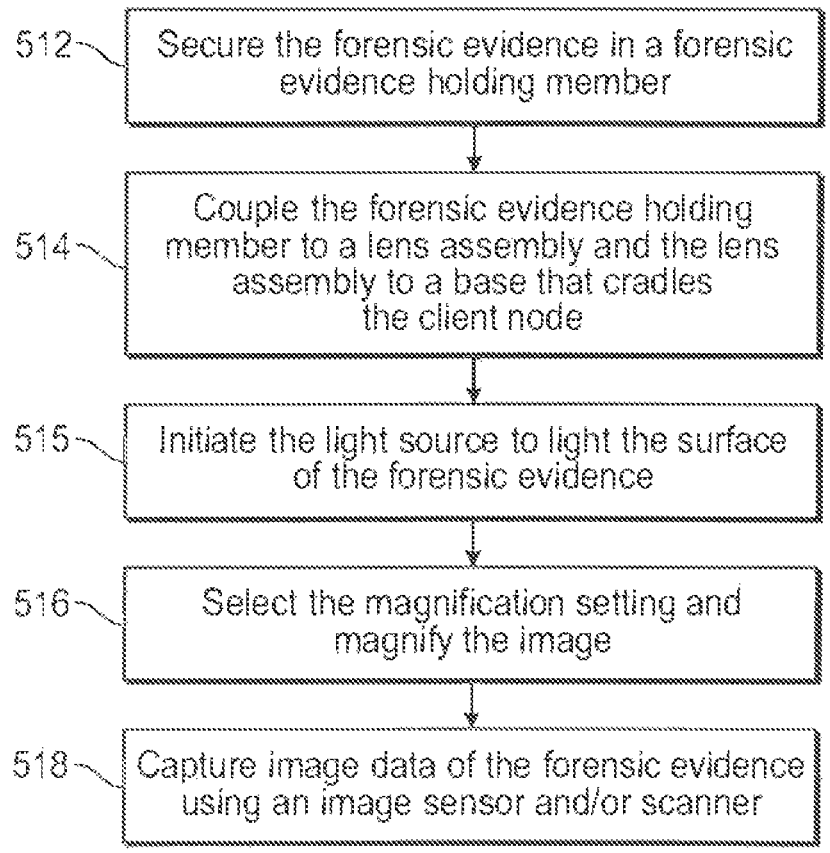
FIG. 9 is a flow diagram of a method of capturing the forensic evidence imaging data in accordance with some embodiments.

Referring to FIG. 9, a flow diagram of a method 511 of capturing the forensic evidence imaging data in accordance with some embodiments is shown. The method may include securing the forensic evidence in a forensic evidence holding member in an action 512. For example, when a criminal investigator arrives at the scene of a crime, the officer can retrieve the shell casings separated from the bullets of the firing arm. The officer can open and close the grasping members 236 around a shell casing to hold the shell casing securely in the evidence stabilizing unit 234. In an action 514, the method may include coupling the forensic evidence holding member to a lens assembly and the lens assembly to a base that cradles the client node. For example, the user can couple the evidence stabilizer unit 234 to the forensic evidence holding member 230; and subsequently coupling the forensic evidence holding member 230 to the lens assembly 220. Further, the user may couple the lens assembly 220 to the cradle 210 that supports the client node 110a having a camera 116, e.g., an image sensor, such that the image sensor optically aligns with the forensic evidence 238. Next, the method may include initiating the light source to light the surface of the forensic evidence in an action 515. For example, the user may turn ON the light source 39 to light the surface for the forensic evidence 238. Additionally, the method may include selecting the magnification setting and magnifying the image of the forensic evidence in an action 516. For example, the user may select whether the image should be magnified at a certain parameter corresponding to a 100-500× amplification. In an action 518, the method may include capturing image data of the forensic evidence using the image sensor. For example, the user may initiate image-capturing feature of built-in camera 116 of the client node 110a to take several images of the forensic evidence 238.

Figure 10:
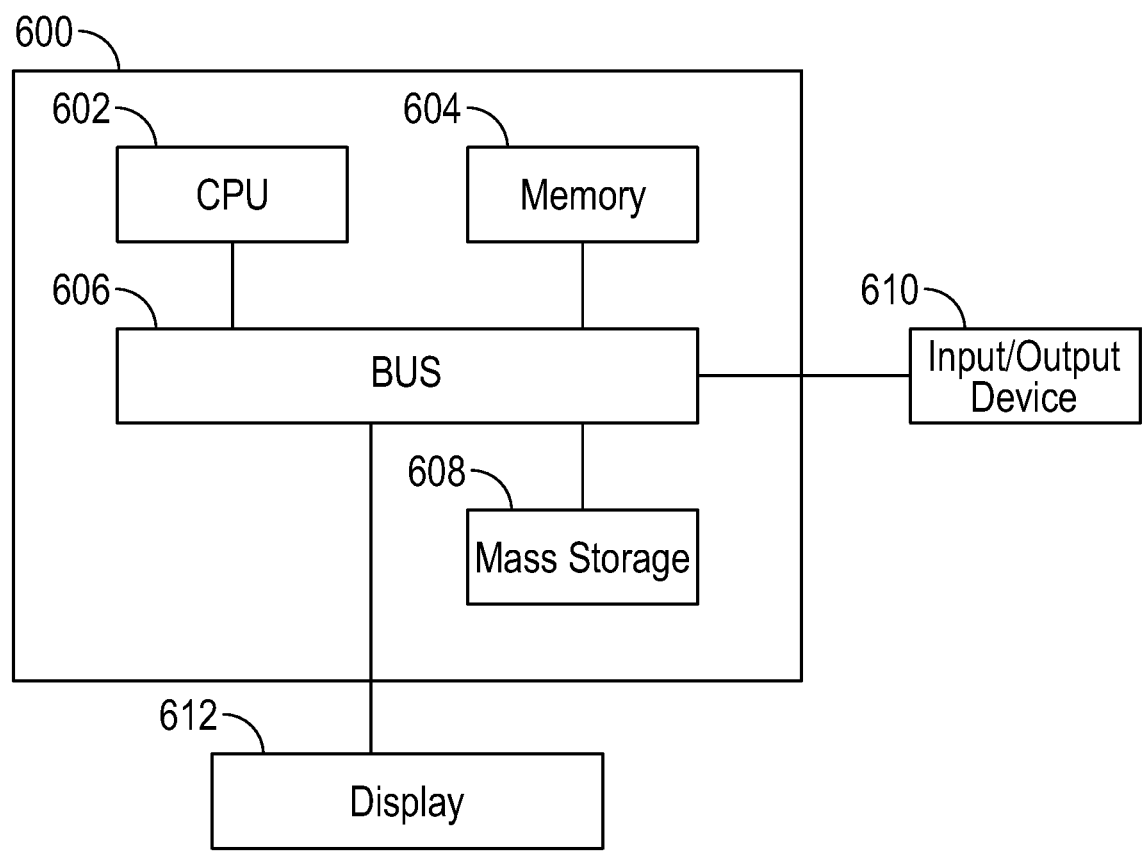
FIG. 10 is an illustration showing an exemplary computing device, which may implement the embodiments described herein.

It should be appreciated that the methods described herein may be performed with a digital processing system, such as a conventional, general-purpose computer system. Special purpose computers, which are designed or programmed to perform only one function may be used in the alternative. FIG. 10 is an illustration showing an exemplary computing device, which may implement the embodiments described herein. The computing device 600 of FIG. 10 may be used to perform embodiments of the functionality for performing forensic detection and analysis in accordance with some embodiments. The computing device includes a central processing unit (CPU) 602, which is coupled through a bus 606 to a memory 604, and mass storage device 608. Mass storage device 608 represents a persistent data storage device such as a floppy disc drive or a fixed disc drive, which may be local or remote in some embodiments. The mass storage device 608 could implement a backup storage, in some embodiments. Memory 604 may include read only memory, random access memory, etc. Applications resident on the computing device may be stored on or accessed through a computer readable medium such as memory 604 or mass storage device 608 in some embodiments. Applications may also be in the form of modulated electronic signals modulated accessed through a network modem or other network interface of the computing device. It should be appreciated that CPU 602 may be embodied in a general-purpose processor, a special purpose processor, or a specially programmed logic device in some embodiments.

Display 612 is in communication with central processing unit (CPU) 602, memory 604, and mass storage device 608, through bus 606. Display 612 is configured to display any visualization tools or reports associated with the system described herein. Input/output device 610 is coupled to bus 606 in order to communicate information in command selections to CPU 602. It should be appreciated that data to and from external devices may be communicated through the input/output device 610. CPU 602 can be defined to execute the functionality described herein to enable the functionality described with reference to FIGS. 1-2 and 8. The code embodying this functionality may be stored within memory 604 or mass storage device 608 for execution by a processor such as CPU 602 in some embodiments. The operating system on the computing device may be iOS™, MS-WINDOWS™, OS/2™, UNIX™, LINUX™, or other known operating systems. It should be appreciated that the embodiments described herein may be integrated with virtualized computing system also.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, and can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

Detailed illustrative embodiments are disclosed herein. Specific functional details disclosed herein are merely representative for purposes of describing embodiments. Embodiments may be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "I" symbol includes any and all combinations of one or more of the associated listed items. As used herein, the singular forms "a", "an" and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved. With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, flash memory devices, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

The foregoing description, for the purpose of explanation, has been described with reference to specific embodiments. The illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, and may be modified within the scope and equivalents of the appended claims.

What is claimed is:

1. A forensic microscope assembly for a client node comprising a processor, a memory, and an image sensor device in data communication with the processor and memory, the forensic microscope assembly comprising:
    a cradle having a base portion, wherein the cradle is operable to receive the client node having the image sensor device;
    a lens assembly coupled to the base portion, such that the lens assembly is positioned to optically align with the image sensor device when the client node is held by the cradle; and
    a forensic evidence holding member coupled to the lens assembly, wherein the forensic evidence holding member aligns with the image sensor device to be magnified by the lens assembly, and
    wherein the forensic evidence holding member is configured to position a bullet shell casing relative to the lens assembly to optically align and image the bullet shell casing with the lens assembly and the image sensor device when the client node is held by the cradle on an axis.

2. The forensic microscope assembly of claim 1, wherein the cradle further comprises:
    a pair of side arms coupled to the base portion for securely holding the client node, and
    wherein the base portion comprises a coupling member for attachment to the lens assembly.

3. The forensic microscope assembly of claim 1, wherein the lens assembly comprises:
    an assembly housing;
    a magnifying lens coupled to the assembly housing;
    a first coupling member coupled to the assembly housing for connecting the lens assembly to the cradle; and
    a second coupling member coupled to the assembly housing for coupling the lens assembly to the forensic evidence holding member.

4. The forensic microscope assembly of claim 1, wherein the lens assembly has an adjustable magnification.

5. The forensic microscope assembly of claim 1, wherein the cradle is operable to receive a mobile phone as the client node.

6. The forensic microscope assembly of claim 1, wherein the forensic evidence holding member comprises a plurality of light sources arranged to illuminate the bullet shell casing with illumination from different directions when the bullet shell casing is positioned relative to the lens assembly.

7. The forensic microscope assembly of claim 6, wherein the plurality of light sources are arranged to illuminate the bullet shell casing with illumination at differing angles when the bullet shell casing is positioned relative to the lens assembly, and wherein light emitted from the plurality of light sources is adjustable over a plurality of viewpoints corresponding to the differing angles.

8. A forensic analysis system comprising the forensic microscope assembly of claim 1, wherein the memory, and the processor are operable to capture image data of the bullet shell casing at the client node using the forensic microscope assembly.

9. The forensic analysis system of claim 8, wherein the processor is further operable to:
   capture Geographical Point System (GPS) coordinate data of a location associated with the bullet shell casing;
   generate a ballistic specimen data packet, wherein the ballistic specimen data packet includes the captured image data and GPS coordinate data;
   send the ballistic specimen data packet to a networked server;
   generate ballistic imaging metadata of one or more tool marks associated with the bullet shell casing from the ballistic specimen data packet at the networked server;
   generate a hit report of forensic evidence having best matching measurements from the ballistic imaging metadata using a database of past forensic evidence; and
   send the hit report having suspect data to the client node.

10. The forensic analysis system of claim 8, wherein the processor, for capturing image data, is operable to control a plurality of lights within the forensic microscope assembly and acquire a plurality of two dimensional images of the bullet shell casing using the forensic microscope assembly and the image sensor device of the client node.

11. The forensic analysis system of claim 10, wherein the processor is operable to convert the plurality of two dimensional images into a three-dimensional model of the bullet shell casing.

12. The forensic microscope assembly of claim 1, wherein the lens assembly is configured to magnify one or more of breech face markings, firing pin markings, and ejection markings of the bullet shell casing for imaging when the bullet shell casing is positioned by forensic evidence holding member relative to the lens assembly.

13. The forensic microscope assembly of claim 1, wherein the forensic evidence holding member is configured to position the bullet shell casing relative to the lens assembly to align a breech face of the bullet shell casing with the image sensor device of the client node.

14. The forensic microscopy assembly of claim 1, further comprising one or more switches configured to adjust a respective intensity of light emitted by a plurality of light sources to adjust an illumination of a field of light for capturing striations on the bullet shell casing when the bullet shell casing is positioned by forensic evidence holding member relative to the lens assembly.

15. A forensic microscope assembly comprising:
   a cradle having a base portion, wherein the cradle is operable to receive a client node comprising a processor, a memory, and an image sensor device in data communication with the processor and memory;
   a lens assembly coupled to the base portion, such that the lens assembly is positioned to optically align with the image sensor device when the client node is held by the cradle; and
   a forensic evidence holding member coupled to the lens assembly, wherein the forensic evidence holding member aligns with the image sensor device to be magnified by the lens assembly, wherein the forensic evidence holding member comprises:
      a housing;
      an evidence stabilizer coupled to the housing, the evidence stabilizer having one or more grasping members, wherein the one or more grasping members hold forensic evidence in place; and
      a light source coupled to the housing for providing light adjacent to the forensic evidence.

16. The forensic microscope assembly of claim 15, wherein the light source comprises:
   a plurality of light emitting diodes coupled to the housing in series.

17. The forensic microscope assembly of claim 15, wherein the one or more grasping members comprises:
   an iris diaphragm having a plurality of moving blades, each moving blade placed overlapping a differing blade of the plurality of moving blades, wherein the moving blades are curved to form a round iris opening for receiving the forensic evidence.

18. The forensic microscope assembly of claim 15, wherein the light source coupled to the housing for providing light adjacent to the forensic evidence further comprises one or more switches configured to adjust an intensity of light emitted by the light source.

19. The forensic microscope assembly of claim 15, wherein the housing further comprises a rotatable grip portion configured to rotate a portion of the housing to engage the one or more grasping members to secure the forensic evidence within the forensic evidence holding member.

20. The forensic microscope assembly of claim 15, wherein the light source coupled to the housing for providing light adjacent to the forensic evidence further comprises one or more switches configured to adjust an angle at which the light source illuminates the forensic evidence.

21. The forensic microscope assembly of claim 20, wherein the lens assembly optically aligns with the image sensor device along an axis and the one or more switches are configured to adjust the angle at which the light source illuminates the forensic evidence at different azimuthal angles about the axis.

22. The forensic microscope assembly of claim 15, wherein the lens assembly comprises a magnifying lens selectably attachable to the lens assembly.

\* \* \* \* \*